May 12, 1931.    M. E. BIVENS    1,805,160
DIRECTIONAL CONTROL OF DYNAMOELECTRIC DEVICES
Filed Sept. 5, 1928
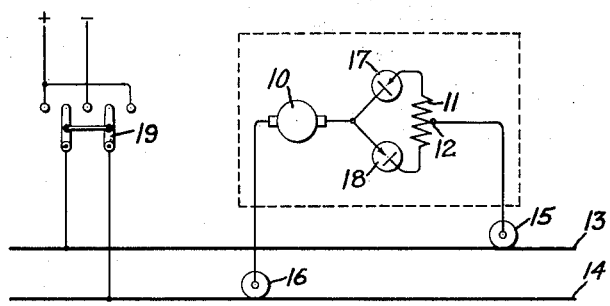
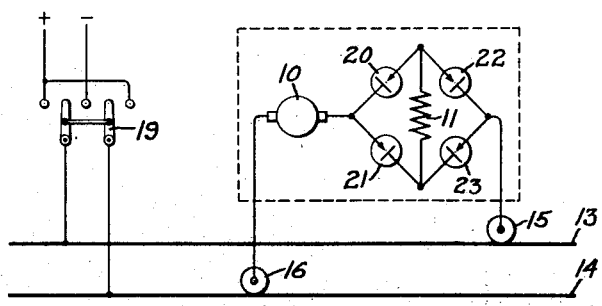
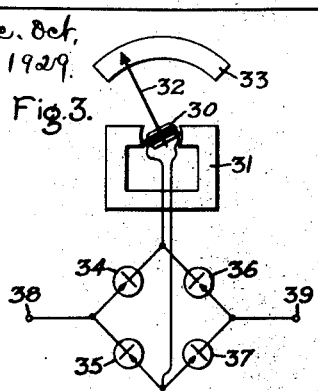
Inventor:
Maurice E. Bivens,
by Charles E. Mullen
His Attorney.

Patented May 12, 1931

1,805,160

UNITED STATES PATENT OFFICE

MAURICE E. BIVENS, OF SCOTIA, NEW YORK, ASSIGNOR TO GENERAL ELECTRIC COMPANY, A CORPORATION OF NEW YORK

DIRECTIONAL CONTROL OF DYNAMOELECTRIC DEVICES

Application filed September 5, 1928. Serial No. 303,989.

This invention relates to the directional control of dynamoelectric devices such for example as electric motors and the like, and more particularly to such devices having a winding movable in a magnetic field by the dynamoelectric reaction of current in the winding with the field.

In devices of this character, the direction of movement of the winding in the magnetic field depends entirely upon the relative direction of current therein with respect to the polarity of the magnetic field in accordance with the well known "left hand" rule. Thus with an electric motor of the ordinary direct current series, shunt or compound type, the direction of rotation of the motor armature remains the same irrespective of a reversal in the polarity of the energizing voltage impressed thereupon. This is due to the fact that the current is reversed in both the armature and the field circuits when the polarity of the impressed voltage is reversed. Hence to control the direction of rotation of such motors ordinarily some form of reversing switch mechanism has been necessary in order to effect a relative reversal of the current in the armature with respect to the magnetic field.

The present invention provides improved means for automatically controlling the direction of movement of dynamoeletcric devices of the character indicated above. Briefly, this is accomplished in accordance with the preferred form of my present invention by providing a plurality of asymmetrical current conducting units which are so connected in the energizing circuit of the electrical device as to produce the desired direction of movement thereof in response to a reversal in the energization thereof.

In the case of the electric motor where the magnetic field is provided by a field winding, the asymmetrical current conducting units are associated either with the armature or with the field windings in such a way that simply a reversal in the polarity of the voltage impressed upon the motor produces the desired reversal in the dynamoelectric reaction between the movable winding and the magnetic field.

In the accompanying drawings illustrating two different embodiments of the invention as applied to the control of electric motors and a single embodiment of the invention as applied to electric meters, Fig. 1 is a circuit diagram showing two asymmetrical current conducting units connected to provide reversing control for an electric motor having its field windings provided with a tap at the mid point, and Fig. 2 is a circuit diagram showing a motor reversing control arrangement involving four asymmetrical current conducting units connected with the field winding on the motor in a Wheatstone bridge type of connection.

In Fig. 1, the electric motor comprises the rotatable armature 10 and the field winding 11 having a tap 12 at the midpoint thereof. The motor as shown is of the ordinary direct current series type having a commutator with brushes associated therewith, and as indicated diagrammatically by the dash lines in the drawing serves to drive a travelling electric car when supplied with current from the power conductors 13 and 14 through the travelling current collectors 15 and 16. In the arrangement shown the midtap 12 of the motor field winding is connected to the power conductor 13 through the travelling current collecting device 15, while one of the brushes for the armature likewise is connected to the power supply conductor 14 through the travelling current collecting device 16.

In order to permit the direction of rotation of the driving motor to be controlled in accordance with the present invention responsively to the polarity of the voltage impressed upon the power conductors 13 and 14, the asymmetrical current conducting units 17 and 18 are connected between the ends of the field winding 11 and the other brush of the armature in the energizing circuit of the motor. Any suitable form of asymmetrical current conducting unit may be used, such for example as a contact type of rectified unit for currents of relatively small value, or an electrolytic or vacuum type of rectifier unit for currents of larger value.

The asymmetrical current conducting units 17 and 18 are reversely connected in the circuit to insure that current of one polarity passes through one portion of the field winding 11 while current of the opposite polarity passes through a different portion of the field winding. However, the arrangement of the field winding is such that the magnetic field always is maintained in the same direction or of the same polarity irrespective of which half of the field winding is energized. A suitable reversing switch 19 is provided for reversing the connection of the power conductors 13 and 14 with the supply source indicated diagrammatically in the drawings as + and −. Thus upon reversing the polarity of the current supplied to the power conductors 13 and 14, the relative direction of the current in the armature 10 is reversed while the magnetic field of the motor is maintained of the same polarity. Consequently, the direction of rotation of the motor is reversed.

With the arrangement shown in Fig. 1 when the reversing switch is operated in one direction, for example to the left, the power conductor 13 is positive and the power conductor 14 is negative. Hence current passes from the positive conductor 13 through the travelling collector 15 to the midpoint 12 of the field winding 11 and then through the upper half of the field winding, the asymmetrical current conducting unit 17, the armature 10, and the travelling collector 16, to the negative power conductor 14. Under these conditions the driving motor 10 of the car may be operated in one direction, for example the forward direction.

To reverse the direction of operation of the driving motor 10, it is only necessary to move the reversing switch 19 to the right and thereby reverse the polarity of the supply conductors 13 and 14. In this case, the power conductor 14 is connected to the + supply line and current flows through the travelling collector 16, the motor armature 10, asymmetrical current conducting unit 18 and the lower half of the field winding 11 to the midpoint 12 and thence through the current collector 15 and supply conductor 13 to the negative supply line. Under these conditions the direction of the dynamoelectric reaction between the current in the armature 10 and the magnetic field set up by the field winding 11 is reversed and consequently the armature 10 rotates in the opposite direction.

In the particular arrangement shown in Fig. 2, which is described and specifically claimed in the copending application of Allen S. FitzGerald, Serial #288,012, filed June 25, 1928, and assigned to the assignee of my present invention, four asymmetrical current conducting units 20, 21, 22 and 23 are associated with the field winding 11 in a Wheatstone bridge type of connection such that the current in the entire field winding and consequently the magnetic field set up thereby is maintained in the same relative direction when voltage of either polarity is impressed or the Wheatstone bridge connection arrangement. With this arrangement, there is no necessity for providing a mid-tap for the field winding.

The operation of the reversing control arrangement of Fig. 2 is as follows: When the reversing switch 19 is operated to the right, the track conductor 14 is connected to the positive supply source and current flows through the travelling collector 16, the motor armature 10, the asymmetrical current conducting unit 21 and thence through the entire field winding 11, the asymmetrical current conducting unit 22, the travelling current collector 15, and the track conductor 13 to the negative supply source. The resulting dynamoelectric reaction of the current flow in the armature 10 with the magnetic field set up by current in the field winding 11, produces rotation of the armature 10 in one direction, for example the forward direction.

With the switch 19 thrown to its left hand position, the track conductor 13 is positive and current flows through the travelling current collector 15, the asymmetrical current conducting unit 23, the field winding 11, the asymmetrical current conducting unit 20, armature 10, travelling current collector 16, the track conductor 14 to the negative supply source. Under these conditions the dynamoelectric reaction between the armature and field is reversed and consequently produces rotation of the armature in the reverse direction.

It will be evident that the directional control arrangements of either Fig. 1 or Fig. 2 may be applied with equal facility to control the direction of rotation of a shunt motor instead of a series motor such as indicated in the drawing.

While I have illustrated and described several embodiments of the invention, it will be understood that various changes may be made in the arrangements shown without, however, departing from the spirit and scope of the appended claim.

What I claim as new and desire to secure by Letters Patent of the United States, is:

In combination, an electric motor having a rotatable armature and a field winding provided with a mid-tap, and a pair of asymmetrical current conducting units connected to the ends of said field winding for reversing the dynamo-electric reaction between the armature and field upon a reversal in the energization of the motor.

In witness whereof, I have hereunto set my hand this 4th day of September, 1928.

MAURICE E. BIVENS.